United States Patent

Cowan et al.

[11] Patent Number: 5,602,450
[45] Date of Patent: Feb. 11, 1997

[54] APPARATUS FOR REMOTELY OPERATING AN AUTOMOBILE IGNITION SWITCH

[75] Inventors: Allan L. Cowan, Stockbridge; Mark A. Froelich, Onsted; Donald W. Grimaudo, Riverview; Frederick J. Shaffer, Brooklyn; Jeffrey P. Zyburt, Chelsea, all of Mich.

[73] Assignee: Chrysler Corporation, Auburn Hills, Mich.

[21] Appl. No.: 509,256

[22] Filed: Jul. 31, 1995

[51] Int. Cl.⁶ ................................................. G01M 19/00
[52] U.S. Cl. .................... 318/265; 318/468; 73/865.3; 324/415; 324/555; 123/179.2
[58] Field of Search .................................. 318/560, 565, 318/566, 626, 652, 264, 265, 266, 286, 293, 466, 467, 468; 73/865.3, 865.9; 324/415, 555; 123/179.1, 179.2

[56]             References Cited

U.S. PATENT DOCUMENTS

| | | | |
|---|---|---|---|
| 1,724,918 | 8/1929 | Fehling . | |
| 3,703,092 | 11/1972 | Elliott | 70/248 |
| 3,985,009 | 10/1976 | Lipschutz | 70/252 |
| 4,596,303 | 6/1986 | Tremblay | 180/287 |
| 4,721,192 | 1/1988 | Cano et al. | 188/353 |
| 4,806,712 | 2/1989 | Hoffman et al. | 200/61.62 |
| 5,016,454 | 5/1991 | Al-Sheikh | 70/185 |
| 5,192,152 | 3/1993 | Silvestri et al. . | |
| 5,265,487 | 11/1993 | Williams et al. | 74/422 |

*Primary Examiner*—Bentsu Ro
*Attorney, Agent, or Firm*—Margaret A. Dobrowitsky

[57]                 ABSTRACT

An apparatus for remotely operating an ignition switch mounted on the steering column of an automobile includes a motor mounted on the floor or other surface of the automobile away from the steering column, such that the steering column does not bear the weight of the motor. A drive cable is connected to the motor, and the drive cable is also connected to a coupling which is mounted on the steering column and which is connected to the ignition switch. The coupling translates rotational motion of the drive cable 90°, so that the coupling and drive cable do not unduly project straight out from the steering column and hence do not interfere with other components, e.g., shift levers, that are mounted on the steering column. A position sensor generates a signal representative of the position of the ignition switch, and the signal is received by a controller. In turn, the controller activates the motor as necessary to establish and/or maintain a desired position of the ignition switch.

17 Claims, 3 Drawing Sheets

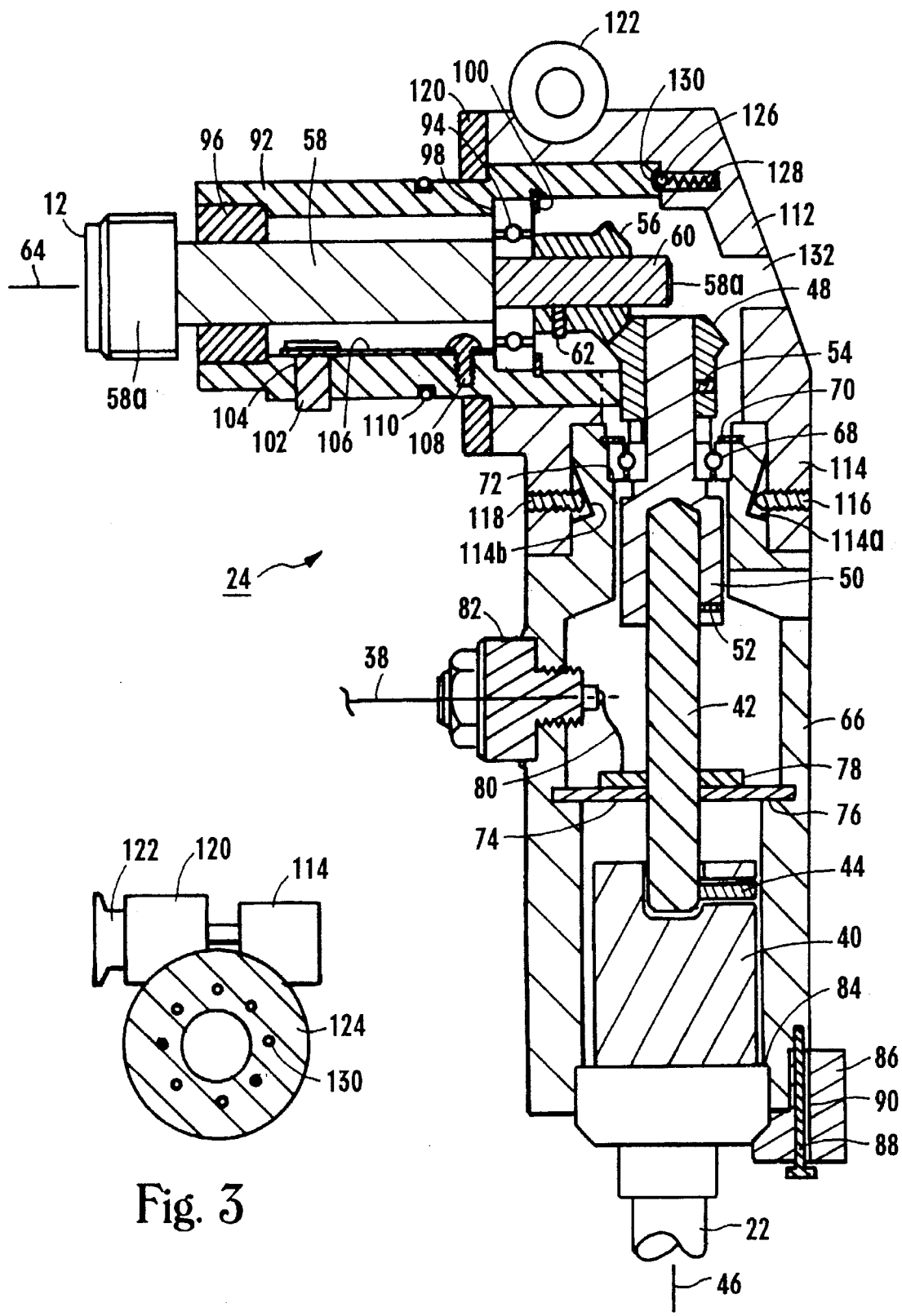

5,602,450

APPARATUS FOR REMOTELY OPERATING AN AUTOMOBILE IGNITION SWITCH

FIELD OF INVENTION

The present invention relates generally to automobile testing and more particularly to apparatus and methods for remote/automatic control of automotive systems during prolonged computer-controlled testing at automobile proving grounds.

BACKGROUND OF THE INVENTION

New models of automobiles are thoroughly tested by manufacturers at proving grounds prior to marketing the automobiles. Indeed, automobile models that have been marketed for some time often undergo continued testing. Such testing includes prolonged operation of test automobiles around a test track, to determine the automobiles' operational fitness.

Until very recently, prolonged automobile testing around a test track required human test drivers to operate the automobiles. It can be readily appreciated that because modern testing requires that hundreds of automobiles be driven hundreds of thousands of miles, it is economically costly for manufacturers to use human drivers. Furthermore, certain tests, such as prolonged tests over rough tracks designed to assess an automobile's structural integrity and suspension system, are physically difficult and trying for human drivers.

It happens, moreover, that the amount of miles that must be driven over rough tracks to evaluate an automobile is significantly less than the amount of miles that otherwise would be required if the automobile were driven over a smooth track. Thus, time can be saved and testing costs reduced by using rough tracks. Unfortunately, as stated above, prolonged driving over rough tracks is physically demanding. Indeed, a human driver's operating time over such tracks must be severely limited for the driver's protection.

Recognizing the above considerations, certain manufacturers, including Chrysler Corporation, have developed automated test tracks over which vehicles can be remotely driven over both rough and smooth tracks, thereby greatly reducing test costs and human fatigue. Typically, a guide strip is positioned on the automated test track, and sensors that are mounted on the test automobiles which are to be driven over the track. The sensors detect the guide strip and generate guidance signals in response, and the guidance signals are sent to a computer that may be located onboard the vehicle to control the operating systems of the vehicle.

Of importance to the present invention is the ignition system of the automobile. To provide for completely automated test driving, the ignition switch of the automobile, which is typically mounted on the steering column, must be moved as appropriate to start the automobile. Also, the switch must be maintained in the "on" position even when the switch is jarred as the automobile traverses a rough track, and moved to the "off" position when, e.g., the automobile is remotely driven into an inspection queue off-track to await human inspection.

As recognized by the present invention, a device for operating the ignition switch of an automobile must not unduly pre-load the steering column, because such devices would be rendered unsuitable for prolonged operation over a rough track. In other words, heavy devices that are mounted on automobile steering columns during operation over rough tracks tend to be damaged or tend to damage the steering column, owing to the jarring effect of the track. Thus, the present invention recognizes that heavy components, e.g., control motors, of such devices, should advantageously be mounted on the automobile away from the steering column.

Additionally, the present invention recognizes that an ignition switch control device should be compatible with a large number of automobile models, to avoid the necessity of providing unique control devices for each model. To this end, the devices must be compact and preferably permit more than a single mounting configuration. Stated differently, the devices ought not to protrude far beyond the steering column, to avoid interference with, e.g., shift levers and the like which may be mounted on various locations of the steering column, depending on the particular model being tested.

Accordingly, it is an object of the present invention to provide an apparatus for automatically operating the ignition switch of an automobile that minimizes the amount of weight it imposes on the steering column. Another object of the present invention is to provide an apparatus for automatically operating the ignition switch of an automobile that is relatively compact and useful with a large number of automobile models. Still another object of the present invention is to provide an apparatus for automatically operating the ignition switch of an automobile that is easy to use and cost-effective.

SUMMARY OF THE INVENTION

An actuator is engageable with a steering column of an vehicle to selectively establish a position of the ignition switch contacts in the steering column. In accordance with the present invention, the actuator includes an ignition switch operating shaft which is couplable to the ignition switch and which is rotatable relative to the steering column. As intended by the present invention, the ignition switch operating shaft defines an ignition switch operating shaft axis.

Further, a drive shaft is coupled to the ignition switch operating shaft for translating rotational motion of the drive shaft to the ignition switch operating shaft. As also intended by the present invention, the drive shaft defines a drive shaft axis which is offset from the ignition switch operating shaft axis. A motor is coupled to the drive shaft to rotate the drive shaft. Advantageously, the motor is mounted on the vehicle such that the motor establishes substantially no pre-load stress on the steering column.

Preferably, a drive shaft bevel gear and an ignition switch operating shaft bevel gear are meshed together to couple the drive shaft to the ignition switch operating shaft. In the preferred embodiment, the bevel gears are configured to establish an orthogonal angle between axes of the shafts.

In addition to the above structure, in the preferred embodiment the actuator includes a drive shaft housing for holding the drive shaft, an ignition switch operating shaft housing for holding the ignition switch operating shaft, and a housing coupling assembly to interconnect the housings. To adapt the coupling to a wide variety of automobile models, the housing coupling assembly is manipulable to permit selectively pivoting the drive shaft housing relative to the ignition switch operating shaft housing about the ignition switch operating shaft axis.

As envisioned by the presently preferred embodiment, the housing coupling assembly includes a body coupled to the drive shaft housing and a plurality of detents protruding from the body and urged outwardly therefrom. The assembly further includes a plurality of cavities that are formed on the ignition switch operating shaft housing for receiving the detents therein to releasably hold the drive shaft housing stationary relative to the ignition switch operating shaft housing.

Moreover, a drive cable interconnects the motor and drive shaft. To sense the position of the drive shaft, a potentiometer is engaged with the drive shaft, and the potentiometer generates a signal representative of the angular position thereof. Additionally, a controller is electrically connected to the potentiometer and the motor for establishing a desired ignition switch position and for activating the motor to rotate the drive cable to cause the drive shaft and ignition switch operating shaft to rotate. Thereby, the desired position of the ignition switch is established.

If desired, a locking pin can be engaged with the ignition switch operating shaft housing and urged outwardly therefrom for engaging a complementarily-shaped structure on the steering column. Also, an o-ring can be surroundingly engaged with the ignition switch operating shaft housing. The o-ring is positionable between the ignition switch operating shaft housing and the steering column to reduce the transmission of vibrations therebetween.

In another aspect of the present invention, an apparatus for automatically operating an ignition switch positioned in a steering column of an automobile includes a motor that is mounted on the automobile away from the steering column. A drive cable is coupled to the motor and is rotatable thereby. Furthermore, a coupling is mounted on the steering column, and the coupling is engaged with the ignition switch and the drive cable for translating rotational motion of the drive cable at the coupling about ninety degrees (90°) and imparting the rotational motion to the ignition switch.

In yet another aspect, a vehicle includes a chassis and a steering column mounted on the chassis. The steering column includes an ignition switch which has a plurality of positions and which defines an ignition switch axis. Additionally, a motor is mounted on the chassis and is distanced from the steering column. Moreover, a coupling is mounted on the steering column for translating rotational motion about a drive axis to rotational motion about the ignition switch axis. In accordance with the present invention, the drive axis is substantially orthogonal to the ignition switch axis. A controller receives a signal representative of the position of the ignition switch. In response, the controller activates the motor as necessary to maintain the ignition switch in a predetermined one of the positions.

In still another aspect of the present invention, a method for automatically establishing a predetermined position of an ignition switch mounted on a steering column in a vehicle includes mounting a motor on the vehicle such that substantially none of the weight of the motor is borne by the drive shaft. The method also includes attaching a drive cable to the motor, and coupling the drive cable to the ignition switch such that rotation of the drive cable is translated about ninety degrees (90°). The motor is then controlled to establish the predetermined position.

The details of the present invention, both as to its structure and operation, can best be understood in reference to the accompanying drawings, in which like reference numerals refer to like parts, and in which:

BRIEF DESCRIPTION OF THE DRAWINGS

FIG. 2 is a cross-sectional view as seen along the line 2—2 in FIG. 1;

FIG. 3 is a cross-sectional view as seen along the line 3—3 in FIG. 1; and

DETAILED DESCRIPTION OF THE PREFERRED EMBODIMENT

Figure 1:
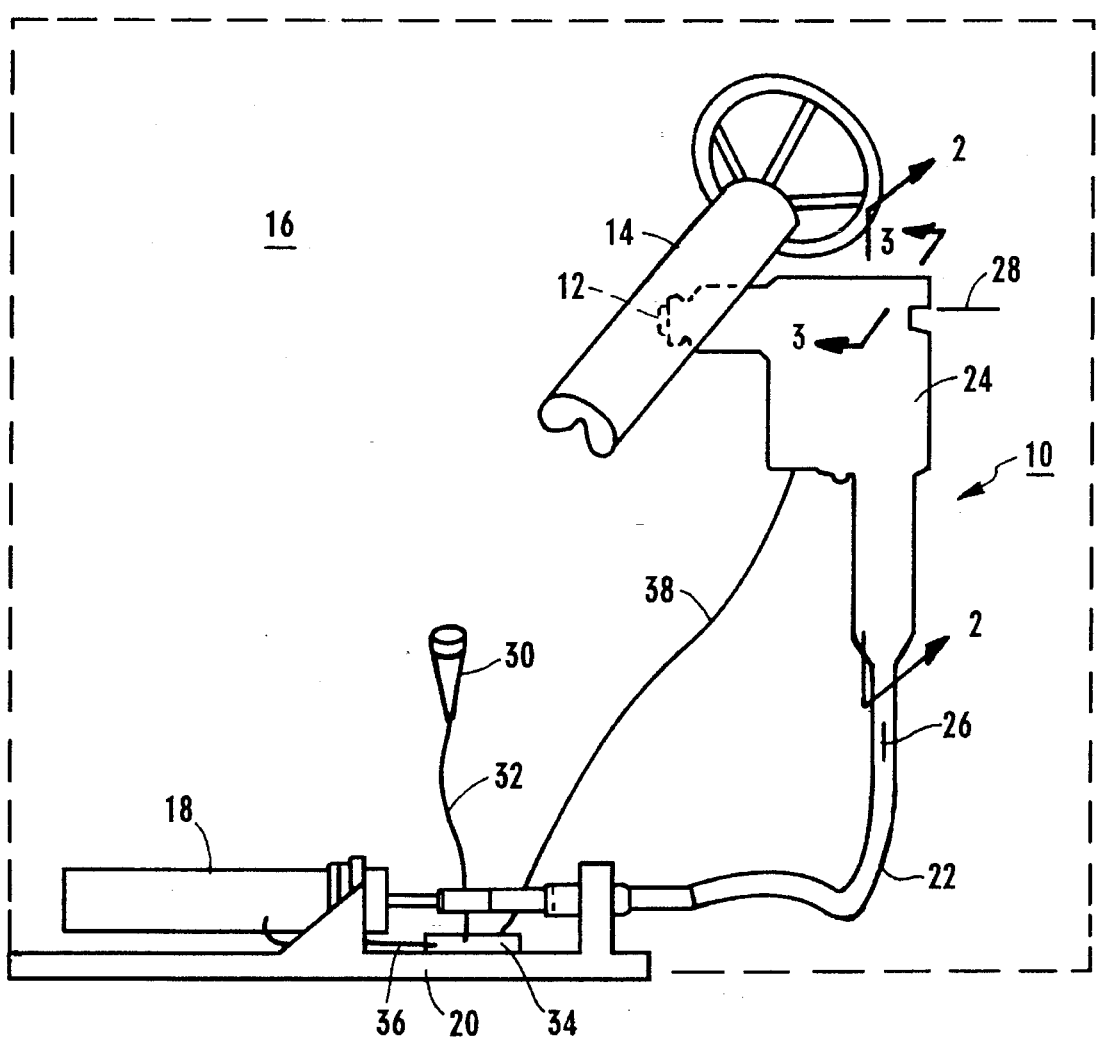
FIG. 1 is a partial perspective and partial schematic view of the ignition switch actuator of the present invention, shown in its intended environment, with portions shown in phantom.

Referring initially to FIG. 1, an actuator, generally designated 10, is shown for operating an ignition switch 12 (shown schematically in FIG. 1) that is positioned on a steering column 14 of an automobile 16 (also shown schematically in FIG. 1). As shown, the actuator 10 includes an electric motor 18 that is mounted on the automobile 16 away from the steering column 14. For example, the motor 18 can be mounted on a floorboard 20 of the automobile 16. In any case, the motor 18 preferably is not mounted on the steering column 14, so that substantially none of the weight of the motor 18 is borne by the steering column 14, i.e., so that the motor 18 establishes substantially no pre-load stress on the steering column 14. In the presently preferred embodiment, the motor 18 is a servo motor made by Motor Technology.

Further, the actuator 10 includes a steel drive cable 22 that is connected to the motor 18. The drive cable 22 transmits torque generated by the motor 18 throughout the length of the drive cable 22.

Also, the actuator 10 includes a coupling 24 which is mounted on the steering column 14. As shown in phantom in FIG. 1, the coupling 24 is engaged with the ignition switch 12 and the drive cable 22.

As shown schematically in FIG. 1, the drive cable 22 defines a cable axis 26 at the interconnection between the drive cable 22 and the coupling 24. As further shown in FIG. 1, the coupling 24 translates rotational motion of the drive cable 22 about the cable axis 26 to rotational motion about a drive axis 28 which is the axis of rotation of the ignition switch 12 and which, as shown in FIG. 1, is offset from the cable axis 26. In other words, the drive axis 28 is the axis of the ignition lock cylinder of the vehicle.

By "offset" is meant that an angle other than a 180° angle is established between the cable axis 26 and the drive axis 28. Preferably, the cable axis 26 is orthogonal to the drive axis 28. Accordingly, the coupling 24 translates rotational motion of the drive cable 22 by approximately ninety degrees (90°) and imparts the rotational motion to the ignition switch 12.

FIG. 1 shows that a power fitting 30 can be provided that is configured for engaging a cigarette lighter receptacle of the automobile 16. The power fitting 30 is connected via an electrical conductor 32 to a circuit board 34, the components of which will be disclosed shortly in reference to FIG. 4. In turn, the circuit board 34 is electrically connected to the motor 18 via an electrical conductor 36, and to the coupling 24 via an electrical conductor 38.

Referring now to FIGS. 2 and 3, the details of the coupling 24 can be seen. As shown in FIG. 2, the drive cable 22 is connected to a rigid steel cable fitting 40, and the cable fitting 40 is in turn rigidly connected to a solid cylindrical steel drive shaft 42. To this end, a plurality of cable fitting set screws (only a single set screw 44 shown) are threadably engaged with the cable fitting 40, and, as the skilled artisan will appreciate, the set screw 44 can be tightened against the drive shaft 42 to hold the drive shaft 42 stationary with respect to the cable fitting 40. Also, the set screw can be loosened to disengage the drive shaft 42 from the cable fitting 40.

As shown in FIG. 2, the drive shaft 42 defines a drive shaft axis 46. It is to be understood that the drive shaft axis 46 is parallel to, and indeed preferably is collinear with, the cable axis 26 shown in FIG. 1.

FIG. 2 additionally shows that the coupling 24 includes a hollow steel drive bevel gear 48, and the drive bevel gear 48 is coupled to the drive shaft 42 via a drive bevel coupling 50. More particularly, the drive shaft 42 extends into the drive bevel coupling 50, and the drive shaft 42 is held therein by a plurality of drive coupling set screws (only a single set screw 52 shown in FIG. 2). Moreover, the drive shaft 42 extends into the hollow drive bevel gear 48 and is held therein by a plurality of drive bevel set screws (only a single set screw 54 shown in FIG. 2). With the above-described combination of structure in mind, it will be appreciated that when the set screws are tightened, rotation of the drive cable 22 is transmitted to the drive bevel gear 48 to cause the gear 48 to rotate.

FIG. 2 further shows that the drive bevel gear 48 meshes with a hollow steel steering column bevel gear 56 to translate rotational motion of the drive bevel gear 48 most preferably by ninety degrees (90°). As shown, the steering column bevel gear 56 is coupled to an ignition switch operating shaft 58 via a projection 60 which can be made integrally with the ignition switch operating shaft 58 or made separately from the shaft 58 and then welded or pinned thereto. The projection 60 extends into the steering column bevel gear 56, and the projection 60 is held therein by a plurality of coupling set screws (only a single set screw 62 shown in FIG. 2). Further, the ignition switch operating shaft 58 defines an ignition switch operating shaft axis 64 which is parallel to, and indeed is preferably collinear with, the drive axis 28 shown in FIG. 1. In accordance with the present invention, the ignition switch operating shaft 58 is coupled to the ignition switch 12 via a coupling 58a to impart rotational motion thereto and to hold the ignition switch 12 in a predetermined angular position.

Referring back to the drive shaft 42, a hollow steel drive shaft housing 66 holds and supports the drive shaft 42 with associated drive bevel gear 48. More specifically, the drive shaft housing 66 supports a radial bearing 68, and the radial bearing 68 in turn supports the drive bevel coupling 50 (and, hence, the drive shaft 42). It can be appreciated in reference to FIG. 2 that a snap ring 70 is positioned in the drive shaft housing 66 to retain the radial bearing 68 in place against a circular support flange 72 of the housing 66.

Still referring to FIG. 2, a disc-shaped potentiometer support plate 74 is positioned in the drive shaft housing 66 against a circular potentiometer support flange 76 of the housing 66. A potentiometer 78, schematically shown in FIG. 2, is mounted on the potentiometer support plate 74 by means well-known in the art, and the potentiometer 78 is coupled to the drive shaft 42. Accordingly, it can be appreciated that the potentiometer 78 generates an electrical signal representative of the angular position of the drive shaft 42 and, hence, the other components of the coupling 24 that are coupled to the drive shaft 42.

A potentiometer line 80 connects the potentiometer 78 to the electrical conductor 38 (and, hence, the circuit board 34 shown in FIG. 1) via an electrical connector fitting 82. The fitting 82 is in turn engaged with the drive shaft housing 66 by means well-known in the art.

FIG. 2 also shows that the cable fitting 40 is held against a circular cable fitting flange 84 of the drive shaft housing 66 by a fitting retainer 86. To hold the fitting 40 against the fitting flange 84, a fitting screw 88 extends through the fitting retainer 86 and is threadably engaged with a channel 90 that is formed in the drive shaft housing 66.

Like the drive shaft 42, the ignition switch operating shaft 58 is supported inside a housing. More particularly, the ignition switch operating shaft 58 is supported inside an ignition switch operating shaft housing 92 by a radial bearing 94 and a bushing 96. The radial bearing 94 is held, by a snap ring 100, against a circular bearing flange 98 that is formed on the ignition switch operating shaft housing 92.

A holding pin 102 is reciprocally disposed in a channel 104 that is formed in the ignition switch operating shaft housing 92. To urge the holding pin 102 radially outwardly, such that the holding pin 102 can engage complementarily-formed structure in the steering column 14 and thereby lock the ignition switch operating shaft housing 92 in position within the steering column 14, a flat spring 106 is attached to the housing 92. As shown, a fixed end of the spring 106 is held on the housing 92 by a connector 108, and a free end of the spring contacts the pin 102 to urge it radially outwardly. Desirably, a resilient rubber or plastic toroidal-shaped o-ring 110 is positioned around the ignition switch operating shaft housing 92, to absorb vibrations and thereby reduce the transmission of vibrations between the housing 92 and the steering column 14.

With above disclosure in mind, it may now be appreciated that the ignition lock cylinder of the automobile 14 is removed and replaced by the ignition switch operating shaft housing 92. In other words, the ignition switch operating shaft housing 92 is configured for being received in the ignition lock cylinder cavity of the automobile 14 for engaging the ignition switch that is mounted in the steering column 14.

Continuing with the description of FIG. 2, a housing coupling assembly 112 is coupled to the drive shaft housing 66 and ignition switch operating shaft housing 92 to connect the housings 66, 92 together. Advantageously, as more fully disclosed below the housing coupling assembly 112 is manipulable to permit selectively pivoting the drive shaft housing 66 relative to the ignition switch operating shaft housing 92 about the ignition switch operating shaft axis 64.

With specific regard to the housing coupling assembly 112, cross-reference is made to FIGS. 2 and 3. The assembly 112 includes a body 114 which is tightly coupled to the drive shaft housing 66. In the presently preferred embodiment, the body 114 is formed with a circular groove 114a having an angled wall 114b. As shown best in FIG. 2, two assembly set screws 116, 118 are threadably engaged with the drive shaft housing 66, and each set screw 116, 118 protrudes into the circular groove 114a and against the angled wall 114b. As the set screws are tightened, they ride against the angled wall 114b, thereby urging the drive shaft housing 66 into tight engagement with the body 114 of the housing coupling assembly 112.

In cross-reference to FIGS. 2 and 3, the housing coupling assembly 112 further includes a disc-shaped collar 120 which is connected to the body 114 by a pinch bolt 122. An annular engagement flange 124 is formed on the ignition switch operating shaft housing 92, and the flange 124 is sandwiched between the body 114 and collar 120. If desired, the collar 120 can be retained on the body 114 by a set screw (not shown).

Accordingly, the skilled artisan will appreciate that the pinch bolt 122 can be tightened to hold the housing coupling assembly 112 in tight engagement with the ignition switch operating shaft housing 92. Moreover, a plurality of round detents 126 are engaged with the body 114 and are urged outwardly therefrom by respective springs 128. As shown in cross-reference to FIGS. 2 and 3, the detents 126 rest in respective hemispherically-shaped cavities 130 that are formed on the engagement flange 124. When the pinch bolt 122 is tightened, the detents 126 are firmly seated in the cavities 130 to prevent rotational motion between the housing coupling assembly 112 and ignition switch operating shaft housing 92.

On the other hand, the pinch bolt 122 can be loosened to permit the detents 126 to be distanced from the cavities 130. Then, the drive shaft housing 66 and housing coupling assembly 112 can be pivoted about the ignition switch operating shaft axis 64 relative to the ignition switch operating shaft housing 92 to establish an orientation between the housings 66, 92 as appropriate to avoid interference with other components of the particular automobile 14. A tool channel 132 can be formed in the body 114 to permit inserting a tool to engage an end 58b of the ignition switch operating shaft 58 for aligning the shaft 58 as necessary with the particular ignition switch 12.

Figure 4:
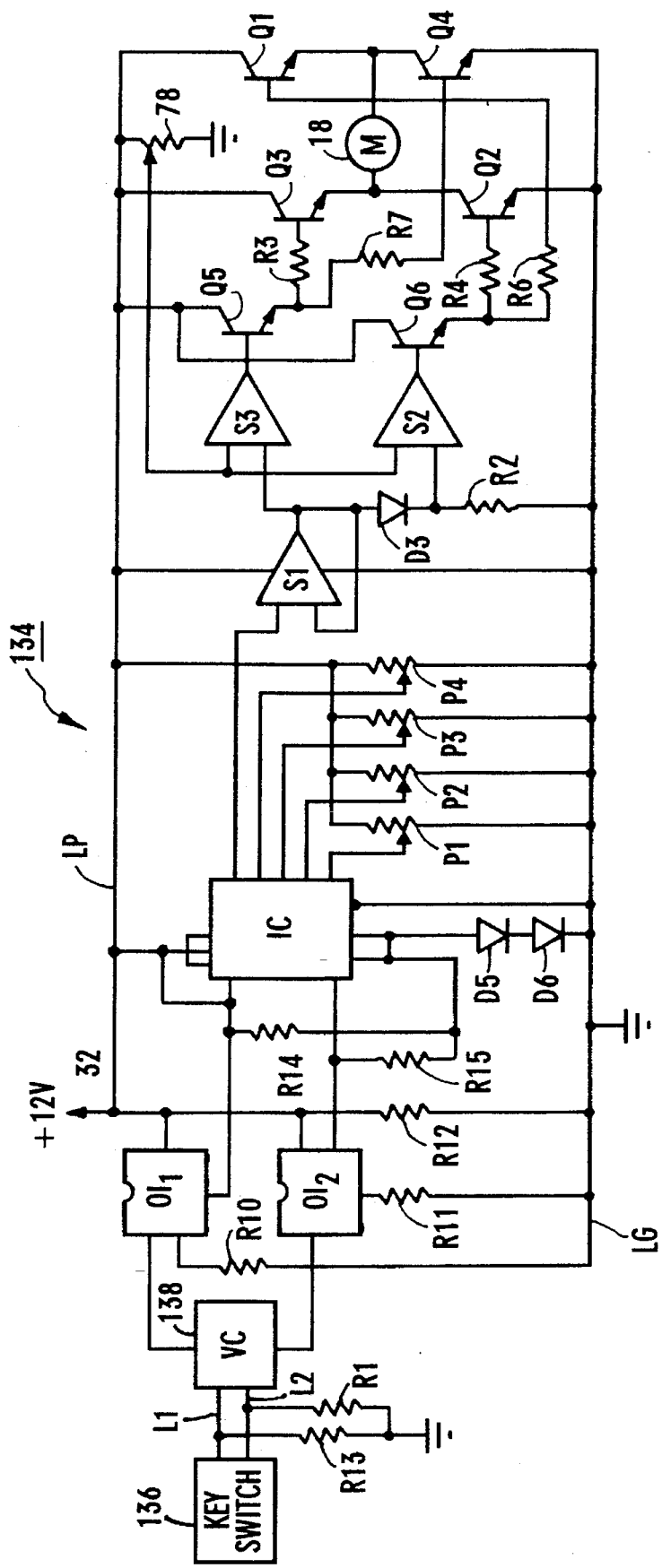
FIG. 4 is an electrical schematic diagram of the actuator controller of the present invention.

Now referring to FIG. 4, the controller of the present invention, generally designated 134, can be seen. It is to be understood that the controller 134 is mounted on the circuit board 34 shown in FIG. 1.

In accordance with the present invention, the controller 134 receives a signal from the potentiometer 78 that is representative of the angular position of the drive shaft 42. Because the drive shaft 42 is coupled via the bevel gears 48, 56 to the ignition switch 12, the signal from the potentiometer 78 is representative of the angular position of the ignition switch 12. As more fully disclosed below, the controller 134 activates the motor 18 in response as necessary to maintain the ignition switch 12 in a predetermined one of its positions (typically, "on", "off", "crank", and "lock"). It is to be understood that while FIG. 4 shows a hardware embodiment of the present invention, those skilled in the art will recognize that the controller 134 alternatively can be implemented with equivalent software to perform the operational steps disclosed below.

Starting on the left side of the diagram shown in FIG. 4, a manual key switch 136 is provided that can be manipulated by a robot or person (not shown) to establish a desired position of the ignition switch 12. The manual switch 136 is electrically connected to a voltage controller 138 via electrical lines L1, L2. The lines L1, L2 are connected to ground through respective grounding resistors R1, R13. Table 1 following provides the values for all resistors discussed herein.

In the presently preferred embodiment, the voltage controller 138 is a type 68HC711 microprocessor made by Motorola. As shown in FIG. 4, it is connected to two type TIL 111 opto-isolator interfaces $OI_1$, $OI_2$. Each opto-isolator interface $OI_1$, $OI_2$ is connected to a ground line LG through respective grounding resistors R10, R11.

As shown in FIG. 4, the output of each opto-isolator interface $OI_1$, $OI_2$ is sent to a memory device IC. In the presently preferred embodiment, the memory device IC is a type HI 1-158-2 analog multiplexer made by Harris Semiconductor. As further shown in FIG. 4, various pins of the memory device IC receive twelve volt DC (12 vDC) battery voltage via the electrical conductor 32 (FIGS. 1 and 4). The input lines from the opto-isolator interfaces $OI_1$, $OI_2$ are connected via resistors R14, R15, and a power line LP taps off of the electrical conductor 32.

Further, a pin of the memory device IC is connected to the outputs of the opto-isolator interfaces $OI_1$, $OI_2$, and this pin is grounded through two series type 1N4001 diodes D5, D6. The outputs of the opto-isolator interfaces $OI_1$, $OI_2$ are also grounded through a resistor R12.

Moreover, four pins of the memory device IC receive respective input signals from four ignition set potentiometers P1, P2, P3, P4. As intended by the present invention, the ignition set potentiometers P1, P2, P3, P4 can be manipulated to establish baseline reference signals for the "off", "on", "crank", and "lock" positions, respectively, of the ignition switch 12 as appropriate for the particular automobile 16. These reference signals are compared by the memory device IC to the signal from the key switch 136 to determine the desired position of the ignition switch 12. As shown in FIG. 4, the ignition set potentiometers P1, P2, P3, P4 extend between the power line LP and the ground line LG.

The output of the memory device IC is sent to the first stage S1 of a so-called quad operational amplifier (opamp) made by National Semiconductor. The first stage S1 is essentially an electronic buffer.

Still referring to FIG. 4, the output of the first stage S1 is sent to second and third stages S2, S3 of the opamp. The second and third stages S2, S3 function essentially as comparators which compare the input signal voltage from the memory device IC (i.e., the signal representative of the desired position of the ignition switch 12) to the voltage signal generated by the potentiometer 78 which, as shown in FIG. 4, is sent to the inputs of the second and third stages S2, S3.

As stated above, the signal generated by the potentiometer 78 is representative of the actual position of the ignition switch 12. Accordingly, the output signal of the second and third stages S2, S3 is an error signal which is zero when the ignition switch 12 is in the desired position and otherwise when the ignition switch 12 has not been positioned in the desired position or has been jarred from the desired position.

All three stages S1, S2, S3 are connected to the ground line LG through a type 1N4001 diode D3 and a resistor R2. It is to be understood that the diode D3 establishes the window of comparison used by the second and third stages S2, S3 of the opamp.

FIG. 4 shows that the output of the opamp is sent to the bases of first and second type 2N3904 base current driver transistors Q5, Q6. The output of the first base current driver transistor Q5 is sent to the bases of first and second type JE801 motor power transistors Q3, Q4 via respective resistors R3, R7. On the other hand, the output of the second base current driver transistor Q6 is sent to the bases of third and fourth type JE801 motor power transistors Q2, Q1 via respective resistors R4, R6.

Essentially, the first and third motor power transistors Q3, Q2 establish a first motor power line which extends between the power line LP and the ground line LG, and the motor 18 is electrically connected to the first motor power line as shown between the first and third motor power transistors Q3, Q2. Likewise, the second and fourth motor power transistors Q4, Q1 establish a second motor power line which extends between the power line LP and the ground line LG, and the motor 18 is electrically connected to the second motor power line as shown between the second and fourth motor power transistors Q4, Q1.

Accordingly, when the output of the opamp indicates an error signal, the base current driver transistors Q5, Q6 turn "on" to activate the motor as appropriate to rotate the drive cable and, through the coupling 24, the ignition switch 12 to the desired position.

While the particular APPARATUS FOR REMOTELY OPERATING AN AUTOMOBILE IGNITION SWITCH as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

TABLE 1

| Resistor | Value (Ohms) |
| --- | --- |
| R1 | 100 |
| R2 | 100 |
| R3 | 100 |
| R4 | 100 |
| R6 | 100 |
| R7 | 100 |
| R10 | 820 |
| R11 | 820 |
| R12 | 820 |
| R13 | 100 |
| R14 | 2.2K |
| R15 | 2.2K |

We claim:

1. An actuator engageable with a steering column of an vehicle to selectively establish a position of an ignition switch in the steering column, comprising:

an ignition switch operating shaft engageable with the ignition switch and rotatable relative to the steering column, the ignition switch operating shaft defining an ignition switch operating shaft axis;

a drive shaft coupled to the ignition switch operating shaft for translating rotational motion of the drive shaft to the ignition switch operating shaft, the drive shaft defining a drive shaft axis offset from the ignition switch operating shaft axis; and a motor coupled to the drive shaft to rotate the drive shaft, the motor being mounted on the vehicle such that the motor establishes substantially no pre-load stress on the steering column.

2. The actuator of claim 1, further comprising a drive shaft bevel gear and an ignition switch operating shaft bevel gear meshed with the drive shaft bevel gear to couple the drive shaft to the ignition switch operating shaft.

3. The actuator of claim 2, wherein the bevel gears are configured to establish an orthogonal angle between axes.

4. The actuator of claim 2, further comprising a drive shaft housing for holding the drive shaft, an ignition switch operating shaft housing for holding the ignition switch operating shaft, and a housing coupling assembly to interconnect the housings.

5. The actuator of claim 4, wherein the housing coupling assembly is manipulable to permit selectively pivoting the drive shaft housing relative to the ignition switch operating shaft housing about the ignition switch operating shaft axis.

6. The actuator of claim 5, wherein the housing coupling assembly includes:

a body coupled to the drive shaft housing;

a plurality of detents protruding from the body and urged outwardly therefrom; and a plurality of cavities formed on the ignition switch operating shaft housing for receiving the detents therein and releasably holding the drive shaft housing stationary relative to the ignition switch operating shaft housing.

7. The actuator of claim 6, further comprising:

a drive cable interconnecting the motor and drive shaft;

a potentiometer engaged with the drive shaft for generating a signal representative of the angular position thereof; and a controller electrically connected to the potentiometer and the motor for establishing a desired ignition switch position and for activating the motor to rotate the drive cable to cause the drive shaft and ignition switch operating shaft to rotate to establish the desired position of the ignition switch.

8. The actuator of claim 4, further comprising a locking pin engaged with the ignition switch operating shaft housing and urged outwardly therefrom for engaging a complementarily-shaped structure on the steering column.

9. The actuator of claim 8, further comprising an o-ring surroundingly engaged with the ignition switch operating shaft housing and positionable between the ignition switch operating shaft housing and the steering column to reduce the transmission of vibrations therebetween.

10. An apparatus for automatically operating an ignition switch positioned in a steering column of an automobile, comprising:

a motor mounted on the automobile away from the steering column;

a drive cable coupled to the motor and rotatable thereby; and a coupling mounted on the steering column and engaged with the ignition switch and the drive cable for translating rotational motion of the drive cable at the coupling about ninety degrees (90°) and imparting the rotational motion to the ignition switch.

11. The apparatus of claim 10, wherein the coupling includes:

an ignition switch operating shaft engageable with the ignition switch and rotatable relative to the steering column, the ignition switch operating shaft defining an ignition switch operating shaft axis; and a drive shaft coupled to the ignition switch operating shaft for translating rotational motion of the drive shaft to the ignition switch operating shaft, the drive shaft defining a drive shaft axis offset from the ignition switch operating shaft axis.

12. The apparatus of claim 11, further comprising a drive shaft bevel gear and an ignition switch operating shaft bevel gear meshed with the drive shaft bevel gear to couple the drive shaft to the ignition switch operating shaft, wherein the bevel gears are configured to establish an orthogonal angle between axes.

13. The apparatus of claim 12, further comprising a drive shaft housing for holding the drive shaft, an ignition switch operating shaft housing for holding the ignition switch operating shaft, and a housing coupling assembly to interconnect the housings, wherein the housing coupling assembly is manipulable to permit selectively pivoting the drive shaft housing relative to the ignition switch operating shaft housing about the ignition switch operating shaft axis.

14. The apparatus of claim 13, wherein the housing coupling assembly includes:

a plurality of detents; and a plurality of cavities formed on the ignition switch operating shaft housing for receiving the detents therein and releasably holding the drive shaft housing stationary relative to the ignition switch operating shaft housing.

15. The apparatus of claim 14, further comprising:

a potentiometer engaged with the drive shaft for generating a signal representative of the angular position thereof; and a controller electrically connected to the potentiometer and the motor for establishing a desired ignition switch position and for activating the motor to rotate the drive cable to cause the drive shaft and ignition switch operating shaft to rotate to establish the desired position of the ignition switch.

16. A vehicle, comprising:

a chassis;

a steering column mounted on the chassis, the steering column including an ignition switch having a plurality of positions and defining an ignition switch axis;

a motor mounted on the chassis and distanced from the steering column;

a coupling mounted on the steering column for translating rotational motion about a drive axis to rotational motion about the ignition switch axis, the drive axis being substantially orthogonal to the ignition switch axis; and a controller for receiving a signal representative of the position of the ignition switch and activating the motor in response thereto as necessary to maintain the ignition switch in a predetermined one of the positions.

17. A method for automatically establishing a predetermined position of an ignition switch mounted on a steering column in a vehicle, comprising:

mounting a motor on the vehicle such that substantially none of the weight of the motor is borne by the steering column;

attaching a drive cable to the motor;

coupling the drive cable to the ignition switch such that rotation of the drive cable is translated about ninety degrees (90°); and controlling the motor to establish the predetermined position of the ignition switch.

* * * * *